No. 851,556. PATENTED APR. 23, 1907.
B. OBEAR.
DRIVING MECHANISM FOR AIR COMPRESSORS.
APPLICATION FILED FEB. 1, 1905.
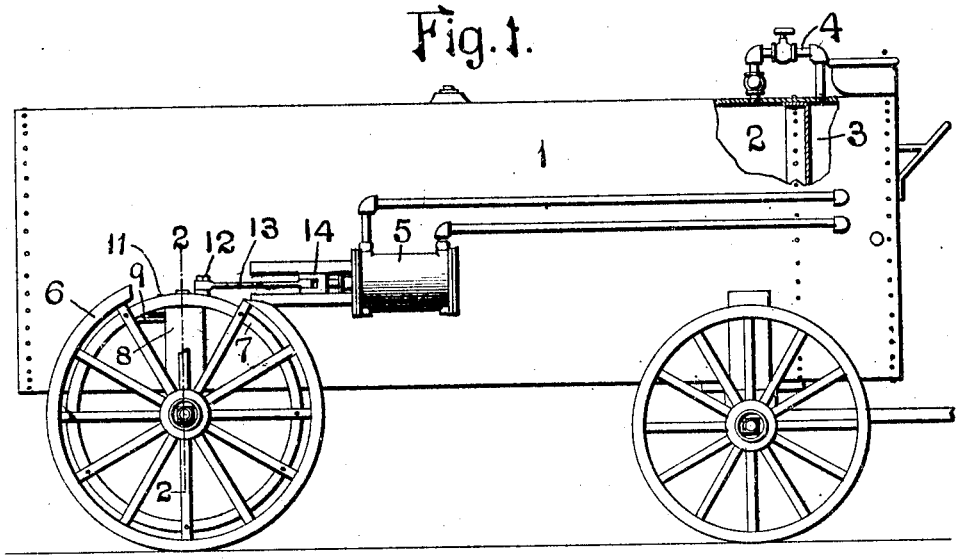
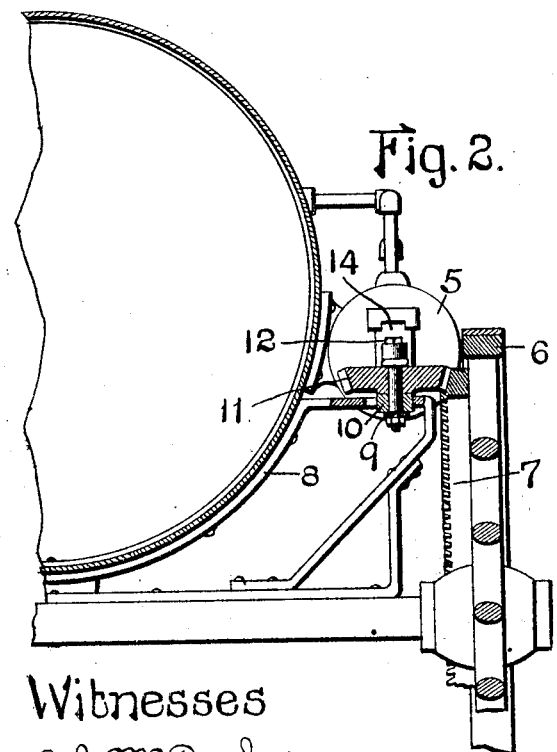
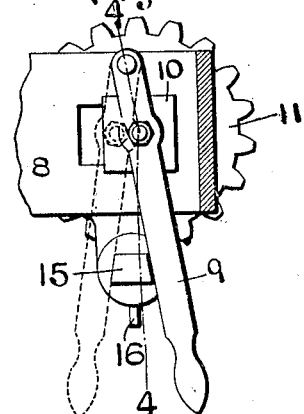
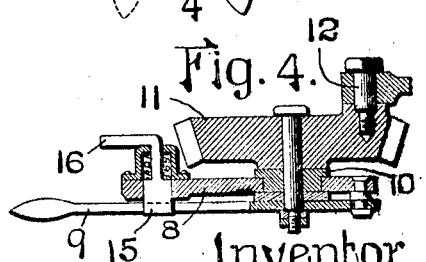
Witnesses
A. J. McCauley.
G. A. Pennington.
Inventor
Bryan Obear
BY Bakewell Cornwall
ATTY'S.

UNITED STATES PATENT OFFICE.

BRYAN OBEAR, OF ST. LOUIS, MISSOURI, ASSIGNOR TO MONTAGUE COMPRESSED AIR COMPANY, OF ST. LOUIS, MISSOURI, A CORPORATION OF MISSOURI.

DRIVING MECHANISM FOR AIR-COMPRESSORS.

No. 851,556.      Specification of Letters Patent.      Patented April 23, 1907.

Application filed February 1, 1905. Serial No. 243,711.

*To all whom it may concern:*

Be it known that I, BRYAN OBEAR, a citizen of the United States, residing at St. Louis, Missouri, have invented a certain new and useful Improvement in Driving Mechanisms for Air-Compressors, of which the following is a full, clear, and exact description, such as will enable others skilled in the art to which it appertains to make and use the same, reference being had to the accompanying drawings, forming part of this specification, in which—

Figure 1 is a side elevational view of a sprinkling cart upon which is mounted my improved mechanism for operating an air compressor; Fig. 2 is an enlarged sectional view on the line 2—2 of Fig. 1; Fig. 3 is a bottom plan view of the shifting lever for throwing the operating mechanism into and out of gear; and Fig. 4 is a sectional view on the line 4—4 of Fig. 3.

This invention relates to a new and useful improvement in driving mechanisms for air compressors, the object being to construct said mechanism with as few parts as is practicable in order to simplify the construction thereof and keep the cost of construction and maintenance down to a minimum.

With these objects in view, the invention consists in the construction, arrangement and combination of the several parts, all as will be hereinafter described and afterward pointed out in the claims.

In Figs. 1 to 4 inclusive I have shown my improvement as applied to street sprinkling apparatus in which 1 indicates the tank, said tank having a compartment 2 for the storage of water and a reservoir 3 for the storage of air. The compartments 2 and 3 are connected by a valved pipe connection 4.

Heretofore as water was introduced into the tank 1 the valved connection 4 was opened and the air permitted to pass from compartment 2 into compartment 3 where it was stored. The water being, say, under forty pounds pressure, would thus fill the compartment 3 with compressed air and by the use of a reducing valve the uniform pressure of air from compartment 3 was admitted onto the surface of the water in the compartment 2.

Another method of operating the so-called pneumatic sprinklers was to store an excess amount of air in compartment 3 and admit the quantity desired onto the surface of water in compartment 2, without relying upon the pressure from the water main to store the air in compartment 3.

In the construction of my invention shown in Figs. 1 to 4 I provide a sprinkling tank with an air compressor 5 and provide means for driving the same from one of the supporting or ground wheels of the vehicle. In this manner I am enabled to get an independent source of compressed air supply which can be regulated at the will of the driver by being thrown into or out of commission as occasion requires.

6 indicates one of the supporting wheels of the vehicle to which is secured a bevel gear 7. 8 indicates a bracket support secured to the tank and to the rear axle of the vehicle, which bracket support has a lever 9 pivotally connected thereto. Lever 9 carries a block 10 slidingly mounted in a way in the bracket 8, upon which block 10 is mounted a bevel pinion 11 carrying a crank pin 12. This crank pin is connected by means of a pitman 13 to the cross head 14 (operating in suitable guide ways) of the air compressor, the piston rod of said compressor of course being connected to said cross head. The free end of lever 9 co-operates with a spring-pressed lug 15 mounted in the bracket 8, said lug having a handle 16 by which it may be raised out of the path of the lever 9.

The operation of the above described construction is as follows: When the lever 9 is so positioned that its carried pinion 11 meshes with the driving gear 7 the cross head 14 of the air compressor will be reciprocated with the result that air is compressed and forced into compartment 3. When a sufficient amount of air is stored in compartment 3, or for any reason it is desired to disconnect the operating mechanism from its primary drive wheel, the handle 16 is manipulated so as to move the lug 15 out of the path of the lever 9 whereby said lever can be swung to the opposite position shown in dotted lines in Fig. 3, in which position the pinion 11 is thrown out mesh with its driving gear 7.

I am aware that changes in the construction, arrangement and combination of the several parts of my device can be made and substituted for those herein shown and described without in the least departing from the nature and principle of my invention.

Having thus described the invention, what is claimed as new and desired to be secured by Letters Patent is:

A street sprinkling apparatus comprising a tank mounted on supports which are secured to the axles of a running gear, said tank being provided with a reservoir for receiving compressed air and a compartment for receiving water, a connection between said reservoir and compartment, an air compressor fastened to said tank, a connection between said compressor and the air reservoir of the tank, a bevel gear secured to the inside of one of the rear wheels of the running gear, a co-operating bevel pinion adapted to mesh with said gear, a crank pin on said pinion, a pitman connected to said crank pin and to the cross head of the air compressor, a movable block mounted in a slot in the tank support which is connected to the axles of the rear wheels, a manually operated lever pivoted to the underneath side of said support and connected to said block for moving the pinion into and out of engagement with the bevel gear, a spring actuated lug mounted in said support and adapted to engage said lever for holding it in either of its adjusted positions, and a handle at the upper end of said lug for moving it into an inoperative position, substantially as described.

In testimony whereof, I hereunto affix my signature, in the presence of two witnesses, this eighteenth day of January 1905.

BRYAN OBEAR.

Witnesses:
F. R. CORNWALL,
GEORGE BAKEWELL.